United States Patent [19]

Baumann

[11] 4,322,055

[45] Mar. 30, 1982

[54] MINUTE FLOW REGULATING VALVE

[76] Inventor: Hans D. Baumann, P.O. Box 471, Rye, N.H. 03870

[21] Appl. No.: 230,343

[22] Filed: Jan. 30, 1981

[51] Int. Cl.³ .......................................... F16K 31/122
[52] U.S. Cl. ..................................... 251/57; 138/45;
 138/46; 236/99 R; 251/122; 251/205
[58] Field of Search ................ 251/205, 57, 62, 63.4,
 251/63.5, 63.6, 77, 118, 121, 122; 138/43, 45,
 46; 137/469, 508, 510, 454.2, 454.6; 236/99 R

[56] References Cited
U.S. PATENT DOCUMENTS

| | | | |
|---|---|---|---|
| 962,736 | 6/1910 | Bice | 251/63.4 |
| 2,956,771 | 10/1960 | Shields | 251/205 |
| 2,966,170 | 12/1960 | Raulins | 251/205 |
| 3,008,684 | 11/1961 | Frame | 251/57 |
| 3,113,756 | 12/1963 | Griffo | 251/57 |
| 3,144,879 | 8/1964 | Baumann | 251/205 |
| 3,380,470 | 4/1968 | Culpepper, Jr. et al. | 251/57 |
| 3,633,608 | 1/1972 | Minkner et al. | 251/57 |
| 3,840,207 | 10/1974 | Carpenter, Jr. | 251/57 |

Primary Examiner—George L. Walton

[57] ABSTRACT

A regulating valve capable of precisely controlling minute amounts of gaseous or liquid fluids following an electronic, pneumatic or manual command wherein the fluid is throttled between parallel surfaces positioned in respect to each other through the use of hydraulic means.

6 Claims, 3 Drawing Figures

MINUTE FLOW REGULATING VALVE

BACKGROUND OF THE INVENTION

This invention is the further improvement of and based on my Adjustable Laminar Flow Restriction, U.S. Pat. No. 3,144,879 issued Aug. 18, 1964, and a continuation in part of my U.S. patent application Ser. No. 06/146.630, dated May 5, 1980. More specifically, it is an adaptation of the Laminar Flow Restriction principle for use as automatically operated small flow control valves, as required by the process control industry and particularly by reduced scale pilot plants or laboratories.

This invention relates to a device capable of restricting the flow of liquid or gaseous media by producing a laminar flow pattern, where the potential energy of the passing fluid is gradually reduced through viscous shear friction along a very narrow opening. The efficiency of such a device depends on the ability to offer as much wetted surface to the passing fluid as possible without necessitating an increase in flow area. This can be better understood by comparing my invention with a piece of tubing. The hydraulic diameter governing the Reynolds number and consequently the amount of fluid friction created in a typical restriction may be written as $$d = 4A/U$$

where A is the flow area and U is the length of wetted surface surrounding the flow area in question. Then for a simple tube or orifice with A=0.785 the hydraulic diameter d=1. Assuming the identical flow area of A=0.785 and 1 as diameter of the inner flow cavity in my invention, d is then calculated to be 0.5 or only half of that of a simple orifice by providing two wetted surfaces instead of one.

Further decrease in d can be obtained by selection of a large internal diameter to flow area ratio which is not possible in orifices. Fine tapered needle valves have been used to provide laminar flow restrictions in the past, where the fluid is forced to pass between the outer wall of a tapered needle and the inner wall of a tapered orifice. However, it has been found that these valves tend to drift, that is, change their effective hydraulic diameter after some time which necessitates quite frequent recalibration. The mechanism of this drift is not completely understood but may be the result of some very minute changes in the plug position due to temperature effects or inherent mechanical stresses. It has been observed that very minute side movements of the plug will effectively change the hydraulic diameter of the valve and therefore its specific fluid resistance.

Use of two parallel surfaces as described in my previous U.S. Pat. No. 3,144,879 does indeed solve the problem of not only providing an exact and reproducible flow passage but also one that provides an extremely wide "Rangeability", i.e. the useful ratio of maximum to minimum mass flow range due to the following mathematical relationship.

If one would designate the distance between the two surfaces controlling the amount of fluid resistance as H, and the radial distance the fluid has to travel through as L, then the differential pressure necessary to pass a given mass flow M is $$\Delta p = (kMLv)/H^3$$

wherein $v$ is the kinematic viscosity of the fluid and k is a dimensional constant. Thus adjusting H will change either the mass flow or the differential pressure by the third power ensuring a very wide rangeability for this device.

The above equation illustrates a dependency of mass flow to H to the third power assuming a consistant pressure drop across the valve. With a typical H or gap variation between two controlling surfaces from 0.0001" to 0.01", the controlled range of mass flow is equal to $1:100^3 = 1:10^6$ which indeed was proved to be correct through flow tests conducted on a preferred embodiment of my invention.

As can be appreciated, the task of adjusting the small gap between the two controlling surfaces is of critical importance. Manual adjustment was solved in my previous (referenced) invention by utilizing the digressive motion of two slightly different pitched screw threads located on a common adjusting screw. This solution works fine, where manual adjustment is sufficient, but is not suitable if adjustment should be the consequence of a variation of an electronic or, preferably, pneumatic signal change from a process controlling instrument.

The present invention has overcome the problem of automatically and of minute adjustments of the controlling gap between two throttling surfaces by utilization of hydraulic amplifying means which, when interspaced between conventional linear motion type pneumatic or hydraulic actuators not only reduce motion of these actuators to the small fraction required, but in the process also amplify the force output of those conventional actuators by typically 30 to 50 times thereby effecting closure of said plates against hydrostatic pressure levels exceeding 3000 psi.

Other noteworthy objections of my invention include the provision of packless valve construction, that is, contrary to needle valves, no seals are in sliding contact with the outside means of adjustments commonly referred to as valve stem and the interior parts subjected to the medium to be controlled. Seals in my invention can be static types and therefore are not subject to wear regardless of the frequency of adjustment.

Yet, still another object of my invention is the provision of a laminar flow restriction, which is rugged for long service life and which is easy and inexpensive to manufacture and which does not require matching of parts, hand honing and other special production methods heretofore required by present devices performing similar functions.

These and other objections and advantages of my invention will best be understood from the following detailed description, when considered in conjunction with the annexed drawings.

DESCRIPTION

Figure 1:
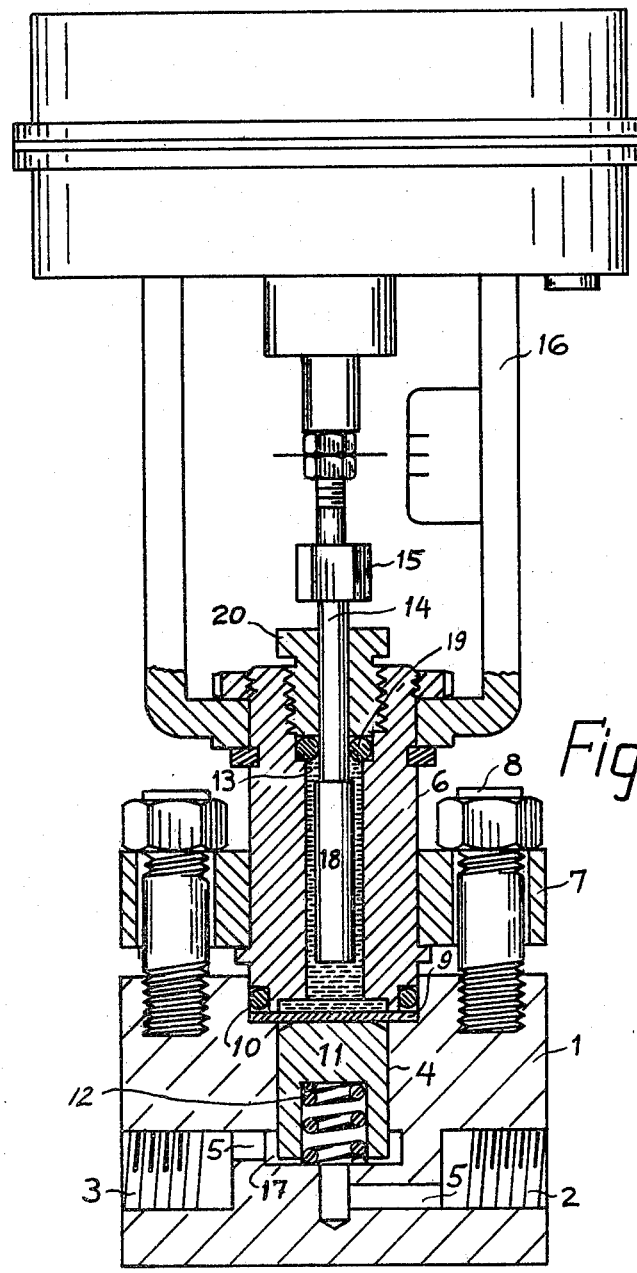
FIG. 1 is a vertical, central, cross-sectional view, showing the preferred structure and arrangement of parts of my invention having flat parallel throttling surfaces.

The subject invention comprises a housing 1 having one inlet port 2 and one outlet port 3 respectively. Housing 1 furthermore has a central longitudinal bore 4 connected to said inlet and outlet ports by fluid egress passages 5. The upper terminating end of bore 4 is sealed by means of a bonnet closure 6, bonnet flange 7 and fastening means 8. A flexible diaphragm 9 is interspaced between the lower terminating portion of bonnet 6 and a stop shoulder 10 in housing 1.

Housing bore 4 slidingly engages a piston 11 whose upper terminating flat portion is forced against diaphragm 10 by a coiled compression spring 12. Referring specifically to FIG. 1, piston means 11 has a flat terminating lower portion which co-operates with a similarly flat surface constituting the lower terminating end of bore 4 creating therebetween a narrow annular throttling gap 17. Bonnet member 6 incorporates a central opening 13 extending throughout its length and enclosing therein a plunger 18 whose upper portion 14 is fastened to a stem extension 15 of a conventional sliding stem type actuating device 16. The lower portion of plunger 18 is totally immersed in a hydraulic fluid contained within opening 13 and enclosed by suitable sealing element 19 retained within the upper portion of bonnet 6 by a threaded retainer 20.

Following a vertically downward movement of actuator stem extension 15, some of the volume of hydraulic fluid contained within opening 13 is displaced causing a downward deflection of flexible diaphragm 10 which in turn forces a downward movement of piston 11, thereby reducing the throttling gap 17. This reduction in gap 17 increases the hydraulic resistance of fluid passing from inlet port 2 to outlet port 3. The final contact between piston 11 and the lower portion of housing 1 will effect a tight closure of the invention valve.

Conversely, a retraction of actuator stem 15 will cause a reduction in the hydraulic volume within opening 13 and thereby causes an upward deflection of diaphragm 10 which in turn allows the coiled compression spring 12 to push piston 11 up and thereby increase the flow area through gap 17.

Figure 3:
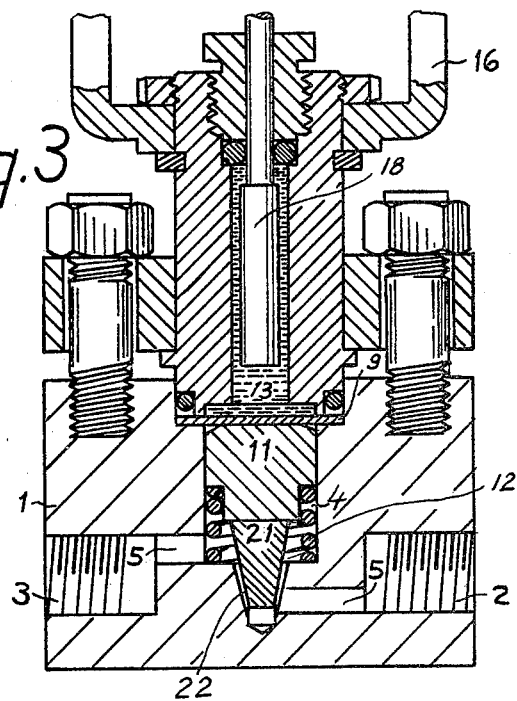
FIG. 3 is a vertical, central, cross-sectional view, showing a structure similar to FIG. 1, but having conical parallel throttling surfaces.

In an alternate design shown in FIG. 3, the lower throttling portion of piston 11 has a conical tip 21 which co-operates with a similar concave recess machined within the lower terminating end of longitudinal bore 4 of housing 1.

In the upper stroke position, as shown, an annular flow passage 22 is generated between the two parallel conical surfaces of piston tip 21 and the body recess performing a similar function to the flat parallel gap 17 in FIG. 1. However, the device in FIG. 3 does provide a finer control action since the gap H between the two parallel surfaces is now a function of the tangent of half of the cone angle. For example, with a cone angle of 30°, the gap height H is only 27% of the similar gap height of passage 17 in FIG. 1.

The typical maximum width of the gap between surfaces 17 and 22 is 0.005". This, combined with a typical radial distance of fluid travel of 0.250" makes the fluid mechanically important L/d ratio at least 250:1 which will keep most fluid conditions in the Laminar regime which in turn will vary the fluid resistance, or amount of fluid being passed under constant pressure drop, to the third power of the gap width H, as discussed previously. This assures an outstandingly wide range between maximum and minimum controlled flow which far exceeds the capabilities of conventional throttling valves.

Figure 2:
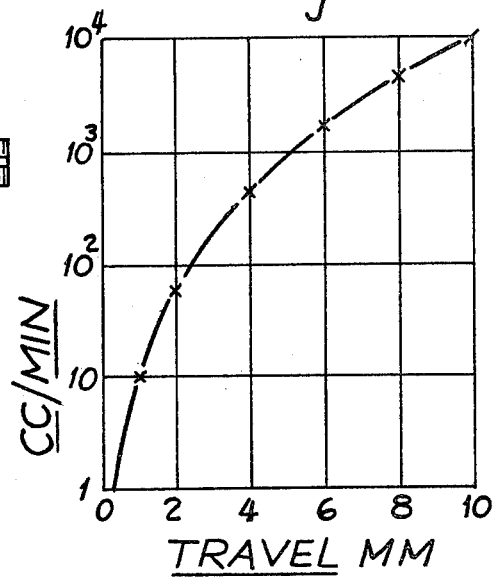
FIG. 2 is a graphical representation of the typical cubical flow characteristic, i.e. relationship between flow and stem travel, of my invention.

For example, a typical embodiment of my invention can vary the amount of gas flow from less than 1 cc/min. at 100 psi pressure drop to more than 10,000 cc/min. as shown in a graph of test measurements depicted in FIG. 2. In contrast, conventional needle type valves heretofore used, seldom exceed a flow range of 50:1!

An added benefit from the hydraulic positioning means employed in my invention, is the benefit of force amplification. A typical embodiment of my invention will have a piston 11 diameter of 1" and a plunger 14 diameter of 3/16". Under the assumption that actuator 16 can produce a force of 100 lbs., a hydraulic fluid pressure of $100 \times 0.187^2 \times 3.14/4 = 3621$ psi can be exerted within opening 13, thereby allowing piston 11 to overcome equally high pressure levels of process fluid passing the gap between surfaces 17 or 22.

One disadvantage of the shown design is the close proximity of the hydraulic fluid in chamber 13 in respect to the process fluid. Any temperature change in the process fluid will in turn vary the temperature of the hydraulic oil, causing thermal expansion and movement of piston 11 independently of actuator 16. However, compensation can be achieved by selecting the material of plunger 18 having a different coefficient of thermal expansion to that of bonnet closure 6.

While preferred embodiment of my invention has been designed to operate primarily in the Laminar flow regime (i.e. at Reynolds numbers generally below 2,000) it should be understood, that turbulence may exist around entrance and exit ports and may even commence between the plate surfaces themselves given high enough fluid velocities. It is also quite obvious to replace hydraulic fluid seals with metal bellows to prevent an even so slight leak or evaporation of hydraulic fluid. This, however, is a purely economic preference and should not be constructed to be a limitation to any of my claims.

It should be understood, that replacement of the pneumatic or electrical actuator 16 with a suitable handwheel arrangement will render my invention capable of manual adjustment and thereby expand the range of its useful applications without departure from the scope of the following claims.

Finally, it is within the skills available in the art to insert a separate seat ring element within the lower portion of central passage 4, thereby providing a replaceable throttling surface for gap 17 or 22, or to invert the conical tip 21 and concave recess so that the smaller portion of piston tip 21 rests against the upper portion of piston 11, even though this necessitates a lower access opening in housing.

Having thus clearly shown and described the invention, what is claimed as new and desired to secure by Letter Patent is:

1. Apparatus for controllably restricting the flow of fluid there through which comprises:

a. a housing having inlet and outlet ports, a longitudinal bore and at least one additional port opening being co-axial and connecting externally with said longitudinal bore;

b. closure member suitably fastened to the additional port opening of said longitudinal bore of the housing to effectively cover the latter, and having a central opening extending co-axial with said longitudinal housing bore and through the length of said closure member;

c. means for creating a frictional flow path located within said longitudinal housing bore and having opposed parallel and engaging surfaces and having outer peripheries spaced interior of said longitudinal bore, one of said means being slidingly engaged within said bore;

d. deformable element or elements interspaced between said means for creating a frictional flow path;

e. a central bore penetrating at least one of the engaging surfaces of said means for creating a frictional flow path to provide fluid access to either the inlet or the outlet port of said housing;

f. means for conducting fluid from either the inlet port or the outlet port to the outer periphery of said engaging surfaces;

g. hydraulic means to effectively position said slidingly engaged means for creating a frictional flow path within said longitudinal bore;

h. flexible diaphragm means interspaced between said hydraulic means and said slidingly engaged means for creating a frictional flow path and said diaphragm means and said slidingly engaged means are retained in said longitudinal bore by said closure member;

i. hydraulic means comprising hydraulic fluid retained within said central opening of said closure member and in contact with said flexible diaphragm;

j. means engaged within said central opening to compress and displace the hydraulic fluid, and;

k. actuating means of conventional art mounted externally of said closure member, disposed to position said means to compress and displace the hydraulic fluid.

2. The apparatus of claim 1, wherein said means for creating a frictional flow path consists of a piston type element engaging said longitudinal housing bore.

3. Apparatus of claim 1, wherein the means to compress and displace hydraulic fluid comprises an externally sealed plunger slidingly engaged within said central opening of the closure member.

4. Apparatus of claim 1, wherein said deformable element consists of a coiled compression spring.

5. Apparatus of claim 3, wherein said sealed plunger is constructed from a material having a thermal expansion coefficient substantially different from that of the closure member material.

6. Apparatus of claim 1, wherein said slidingly engaged means for creating a throttling flow path connects to a conical portion engaging with a similarly shaped portion of the other means for creating a throttling flow path.

* * * * *